Sept. 11, 1928.

W. SCHAELCHLIN 1,684,151

VOLTAGE REGULATOR

Filed Jan. 28, 1926

WITNESSES:
E. A. McClaskey
J. E. Hardy

INVENTOR
Walter Schaelchlin
BY
Wesley J. Carr
ATTORNEY

Sept. 11, 1928.                    1,684,151
W. SCHAELCHLIN
VOLTAGE REGULATOR
Filed Jan. 28, 1926    2 Sheets-Sheet 2
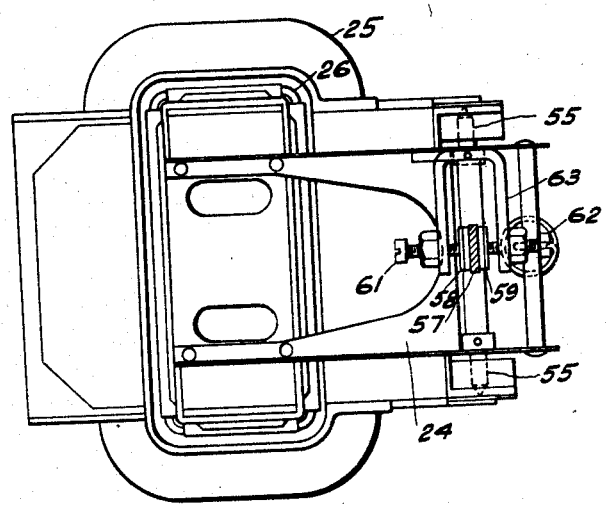
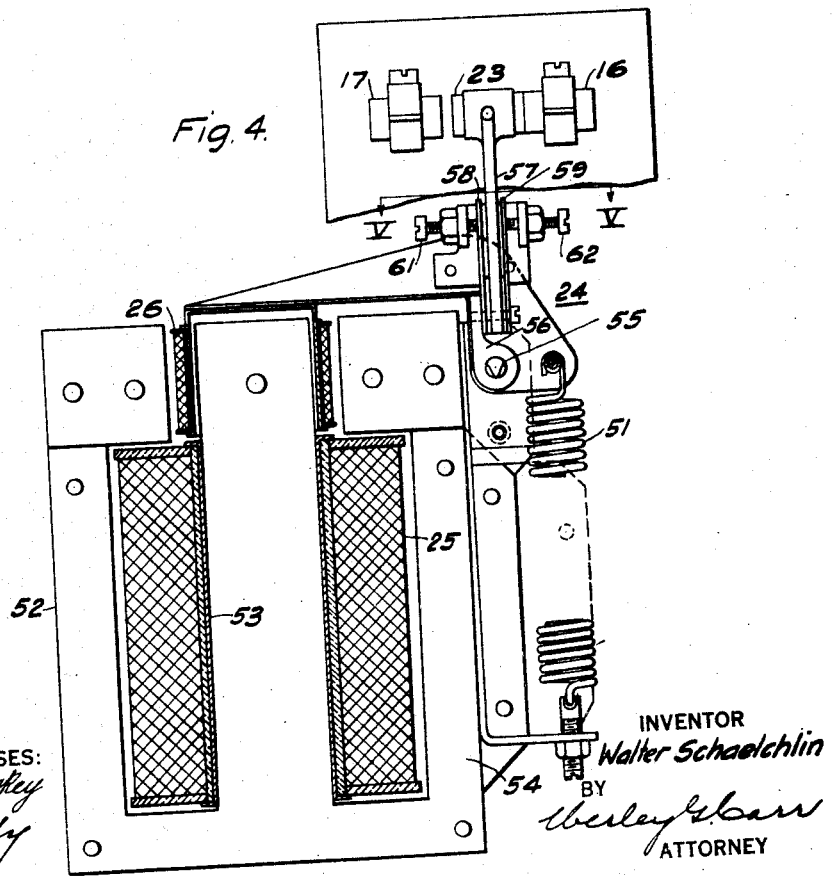
WITNESSES:
E. A. McCloskey
J. E. Hardy
INVENTOR
Walter Schaelchlin
BY
ATTORNEY Patented Sept. 11, 1928.

1,684,151

UNITED STATES PATENT OFFICE.

WALTER SCHAELCHLIN, OF WILKINSBURG, PENNSYLVANIA, ASSIGNOR TO WESTINGHOUSE ELECTRIC & MANUFACTURING COMPANY, A CORPORATION OF PENNSYLVANIA.

VOLTAGE REGULATOR.

Application filed January 28, 1926. Serial No. 84,304.

My invention relates to regulator systems and more particularly to voltage-regulator systems of the vibratory type.

An object of my invention is to provide a regulator system that is sensitive and accurate in its operation, and that is simple in design and inexpensive to operate.

A regulator system organized in accordance with my invention is applicable to railway train-lighting systems. Many regulator systems for such service have been used, but these regulator systems are, in general, complicated in construction and are expensive to operate, not being sufficiently rugged to withstand the requirements of this class of service.

My invention will be better understood by reference to the accompanying drawings, in which Figure 1 is a diagrammatic view of one form of my invention, using a motor-generator set;

Fig. 4 is a view in side elevation of the regulator; and

Fig. 5 is a view of the regulator, partially in plan and partially in section taken on the line V—V of Fig. 4.

Figure 1:
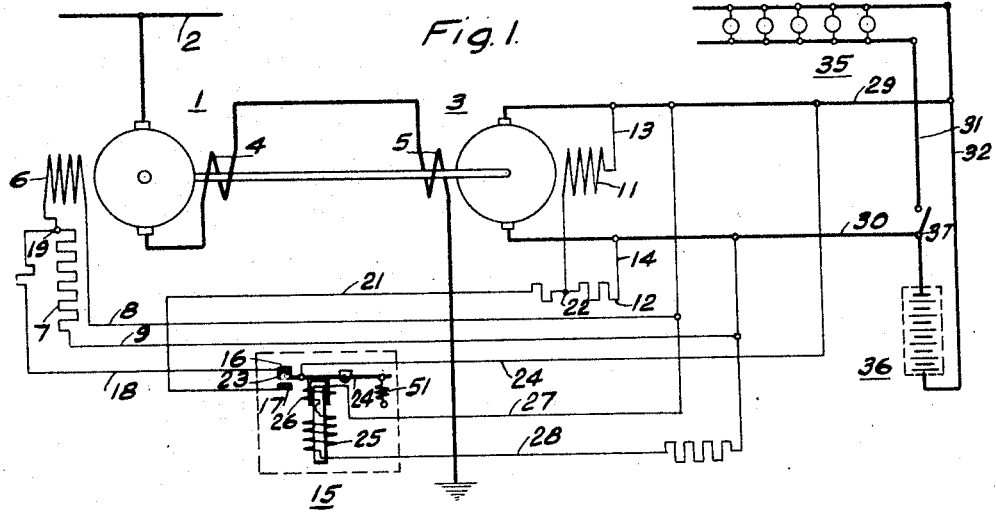

Referring to Fig. 1 of the drawings, a motor 1 is shown connected to a trolley-circuit conductor 2 and driving a generator 3. The motor 1 is provided with a series field winding 4 that is connected in series relation with a field winding 5 of the generator 3. The motor 1 is also provided with a shunt field winding 6 that is connected through a resistor 7 and by means of conductors 8 and 9 to the terminals of the generator 3. The field windings 4 and 6 are cumulative in action. The generator 3 is also provided with a shunt field winding 11 that is connected in series relation with a resistor 12, and by means of conductors 13 and 14, across the generator armature. The field windings 5 and 11 are cumulative in action.

A regulator 15 is provided, having a pair of stationary contact members 16 and 17, one of which is connected, by means of a conductor 18 to a point 19 between the motor shunt field winding 6 and the resistor 7. The other stationary contact member 17 is connected, by means of a conductor 21, to a point 22 between the generator field winding 11 and the resistor 12. A cooperating contact member 23 is movably supported upon a pivoted arm 24 and is connected by means of a conductor 24', to one side of the generator armature.

The regulator 15 is provided with a stationary coil 25 and with a movable coil 26 which is mounted upon the regulator arm that actuates the contact member 23. The two coils 25 and 26 may be connected in series-circuit relation and, by means of conductors 27 and 28, to the armature of the generator 3, so as to be energized in accordance with the generator voltage. A spring 51 normally effects the engagement of contact members 16 and 23. The generator 3 is connected, by means of terminal conductors 29 and 30, and distribution conductors 31 and 32, to a suitable load, such as lamps 35. The generator is further connected in parallel relation to a storage battery 36 which may be connected to the lamps by means of a line switch 37.

Figure 2:
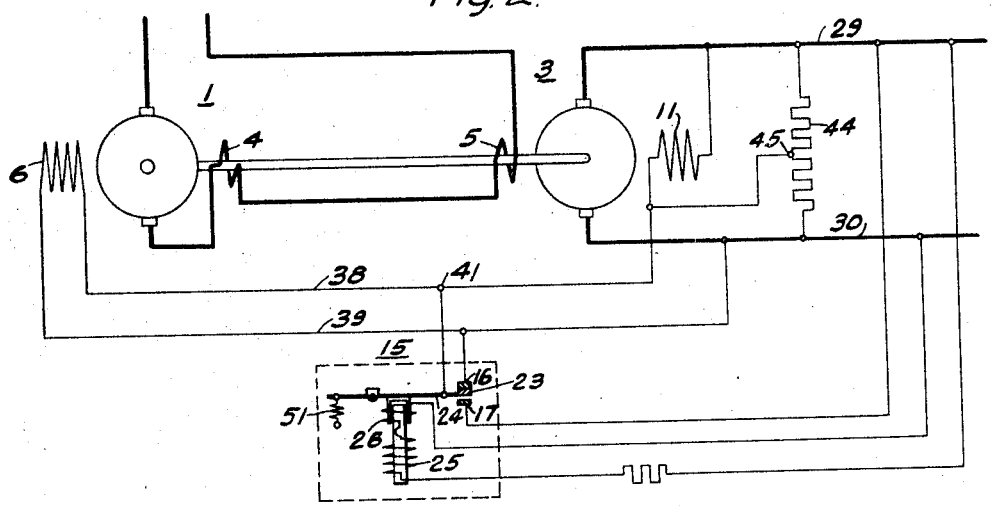
Fig. 2 illustrates a modified form of my invention, wherein a motor-generator set is used having its shunt field windings connected in series-circuit relation.

Referring to Fig. 2 of the drawings, a motor-generator set that is provided comprises a series motor 1 connected in series-circuit relation with the field winding 5 of the generator 3. The shunt field winding 11 of the generator 3 and the shunt field winding 6 of the motor 1 are connected in series-circuit relation by means of conductors 38 and 39, and are energized in accordance with the voltage of the generator. The movable contact member 23 of the regulator 15 is connected to a point 41 between the shunt field windings 6 and 11 of the motor 1 and generator 3, respectively, and the stationary contact members 16 and 17 are connected to opposite generator terminal conductors 30 and 29, respectively. A field shunt discharge resistor 44 may also be connected across conductors 29 and 30, if desired, its mid-point 45 being connected to a point between the two shunt field windings 6 and 11.

Figure 3:
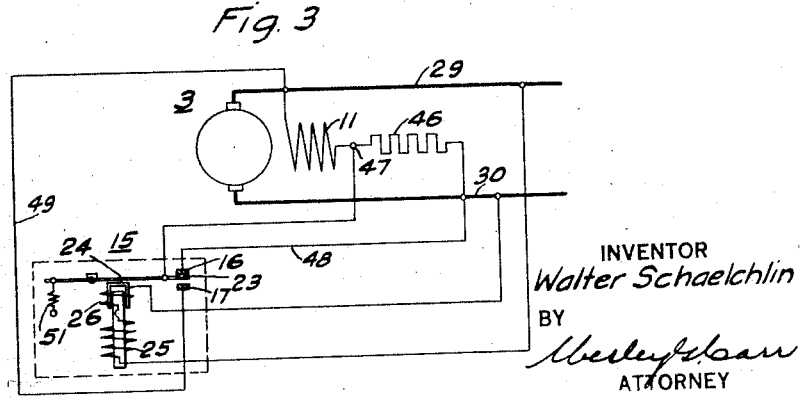
Fig. 3 illustrates a third form of the invention wherein an alternating-current motor, or other prime mover, is used to drive the generator.

Referring to Fig. 3, a regulator system is illustrated wherein the generator circuits are independent of the motor circuits, and may be used where an alternating-current motor, or any other prime mover, such as a gas engine, is available to drive the generator. The generator 3 is provided with a shunt field winding 11 that is connected in series relation with a resistor 46 across the terminal conductors 29 and 30 of the generator 3. The movable contact member 23 of the regulator 15 is connected to a point 47 between the resistor 46 and the field winding 11. The stationary contact members 16 and 17 are connected by means of conductors 48 and 49, respectively, to opposite sides of the generator circuit. The regulator coils 25 and 26 are connected in series relation, across the generator circuit, as in the previous forms of the invention.

The operation of the regulator system shown in Fig. 1 is as follows:

Upon starting the motor-generator set, the movable regulator contact member 23 will be held in engagement with the upper stationary contact member 16 by the spring member 51, so that the shunt field winding 6 of the motor will be short-circuited, thus causing the motor to come up to speed rapidly. At the same time, the series field winding 5 of the generator 3 will carry the heavy starting current of the motor 1, causing a rapid increase of the generator voltage. When the generator voltage has increased to such value that the regulator disengages the contact members 23 and 16, that is, at such value that the magnetic pull of the coils 25 and 26 slightly exceeds the pull of the spring member 51, the motor field winding 6 will be connected, through the resistor 7, across the generator armature. This increase in the strength of the motor field flux will cause the motor speed to decrease. Should the voltage of the generator continue to rise, engagement of the regulator contact members 23 and 17 will short-circuit the generator field winding 11, causing the generator voltage to decrease.

It will be noted that, upon a predetermined drop in the voltage of the generator 3, the generator field winding 11 will again be energized, increasing the generator voltage. If this correction is not sufficient or is not performed rapidly enough to maintain the desired generator voltage, the field winding 6 of the motor 1 is short-circuited by the regulator 15 to increase the speed of the motor-generator set. These operations occur repeatedly at short intervals as the contact member 23 of the regulator vibrates in accordance with the changing pull upon the regulator coils.

For regulating a motor-generator set of this character in this manner, a much smaller generator is required than when a constant-speed motor is used and the voltage is regulated from the generator alone; since, in this case, the speed of the set will not vary appreciably with changing loads on the power line. That is to say, a decrease in the voltage of the trolley line will not cause the speed of the generator to slow down.

In the form of the invention illustrated in Fig. 2, the motor and generator shunt field windings 6 and 11 respectively, are connected in series-circuit relation, and the movable contact member 23 of the regulator is connected between them. In this case, one of the field windings 6 or 11 will act as a resistor in series relation with the other winding so that, as one of the field windings is short-circuited, the voltage across the other field winding is correspondingly increased. This arrangement of circuits also decreases the power loss in the field resistors and the current that it is necessary for the regulator contact members to carry.

The operation of the system illustrated in Fig. 3 is similar to that of the system illustrated in Fig. 2 of the drawing. The resistor 46 is in series circuit relation with the field winding 11 of the generator 3 and corresponds, in its relation to the regulator, to the field winding 6 of the motor.

Referring to Figs. 4 and 5, which illustrate the preferred structure of the regulator relay 15, a magnetic structure is provided having three portions or legs 52, 53 and 54, the two outer portions 52 and 54, together with the middle portion 53, forming two magnetic circuits. The coil 25 for magnetizing the core is mounted upon the middle portion 53 of the magnetic structure, while the small coil 26 that is connected in series relation with the magnetizing coil 25 is mounted upon a movable bifurcated arm 24 and has its conductors surrounding the upper end of the middle core portion 53 and disposed in the flux paths between the ends of the two outer portions 52 and 54, and the central portion 53 of the magnetic structure. The arm 24 is pivotally supported at points 55 outside of the outer magnetic portion 54 and is provided with the vertically-extending coil spring 51 for normally actuating coil 26 and arm 24 in an upward direction.

Upon the arm 24 a support or bracket 56 is attached, carrying an upright lever 57 and a pair of flat spring members 58 and 59 that are adapted to engage stops 61 and 62, respectively. The stops 61 and 62 are illustrated as set screws mounted upon a U-shape structure 63. The lever 57 carries at its upper end the movable contact member 23, which is adapted to engage the fixed contact members 16 and 17. Upon engagement of the movable contact member 23 with either of the fixed contact members 16 and 17, one of the spring members 58 or 59 will be brought under tension to ensure a proper contact pressure between the engaging contact members.

The regulator will be in a balanced condition, that is, the pull of the coils 25 and 26 will just balance the pull of the spring 51 when the voltage of the generator 3 is at its desired value. Inasmuch as the coil 26 is mounted within the air gap between the two portions of the magnetic circuit, a practically constant field of flux will cut the conductors of the coil at all points of its travel. The pull upon the coil member 26 will, therefore, correspond to the voltage impressed upon the regulator circuit. The pull of the coil 26 upon the arm 24 of the regulator will be independent of its position on its line of travel.

By using a low flux density in the iron of the magnetic circuits, variations in the pull of the coil 26 will be substantially double the variations in the impressed voltage, thereby rendering the regulator very sensitive in its operation.

Many modifications may be made in the apparatus and arrangement of parts without departing from the spirit of my invention, and I do not wish to be limited other than by the scope of the appended claims.

I claim as my invention:

1. In a regulator system, a motor, a generator driven thereby, a field winding for said motor and a field winding for said generator, and means actuated in accordance with the generator voltage for short-circuiting said field windings.

2. In a regulator system, a motor, a generator driven thereby, a field winding for said motor and a field winding for said generator, and means actuated in accordance with the generator voltage for separately short-circuiting said field windings.

3. In a regulator system, a motor, a generator driven thereby, a field winding for said motor and a field winding for said generator, a relay having a pair of contact members connected respectively to said field windings and a cooperating movable contact member actuated in accordance with the voltage of said generator for controlling said field windings.

4. In a regulator system, a motor and a generator driven thereby, a field winding for said motor and a field winding for said generator, connected to said generator in series-circuit relation, and means actuated in accordance with the voltage of said generator for short-circuiting said field windings.

5. In a regulator system, a motor and a generator driven thereby, a field winding for said motor and a field winding for said generator connected to said generator in series-circuit relation, and means actuated in accordance with the voltage of said generator for alternately short-circuiting said field windings.

6. In a regulator system, a motor and a generator driven thereby, a field winding for said motor, a field winding for said generator, a circuit comprising said field windings connected to said generator, means for controlling said circuit comprising a contact member connected to said circuit between said field windings, and co-operating contact members connected to said circuit.

7. In a regulator system, a motor, a generator driven thereby and provided with a field winding connected in series-circuit relation with said motor, said motor and said generator being also provided with field windings connected to be energized from said generator, and means energized in accordance with the voltage of said generator for short-circuiting certain of said field windings.

8. In a regulator system, an electric motor, a generator driven thereby and provided with a field winding connected in series-circuit relation with said motor, said motor and said generator being also provided with field windings connected in series relation with each other, and regulator means for governing the excitation of said series connected field windings.

9. In a regulator system, a motor and a generator driven thereby, said motor and generator being provided with field windings connected in series-circuit relation, and a regulator energized in accordance with the voltage of said generator for governing the excitation of said field windings.

In testimony whereof, I have hereunto subscribed my name this 26th day of January, 1926.

WALTER SCHAELCHLIN.